United States Patent
Gottschlag et al.

(10) Patent No.: US 9,990,120 B2
(45) Date of Patent: Jun. 5, 2018

(54) USER INTERFACE ARRANGEMENT AND COMPUTER PROGRAM FOR DISPLAYING A MONITORING PERIOD

(71) Applicant: Robert Bosch GmbH, Stuttgart (DE)

(72) Inventors: Daniel Gottschlag, Nuremberg (DE); Stephan Heigl, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 482 days.

(21) Appl. No.: 14/429,391

(22) PCT Filed: Sep. 16, 2013

(86) PCT No.: PCT/EP2013/069180
§ 371 (c)(1),
(2) Date: Mar. 19, 2015

(87) PCT Pub. No.: WO2014/044643
PCT Pub. Date: Mar. 27, 2014

(65) Prior Publication Data
US 2015/0212719 A1    Jul. 30, 2015

(30) Foreign Application Priority Data

Sep. 24, 2012  (DE) .................. 10 2012 217 152

(51) Int. Cl.
*G06F 3/0484*     (2013.01)
*G06F 3/0482*     (2013.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
CPC .............. G06F 3/04847; G06F 3/0482; G06F 3/04842; G08B 13/19673; G08B 13/19682; G11B 27/34; H04N 7/181
(Continued)

(56) References Cited

U.S. PATENT DOCUMENTS 5,388,197 A * 2/1995 Rayner ................ G11B 27/034
345/660
6,061,062 A * 5/2000 Venolia ................ G06F 3/0481
715/856
(Continued)

FOREIGN PATENT DOCUMENTS

CN       1319984 A       10/2001
DE     102006059065      6/2008
(Continued)

OTHER PUBLICATIONS

International Search Report for Application No. PCT/EP2013/069180 dated Dec. 5, 2013 (English Translation, 2 pages).

*Primary Examiner* — Jay Patel
*Assistant Examiner* — Marnie Matt
(74) *Attorney, Agent, or Firm* — Michael Best & Friedrich LLP

(57) ABSTRACT

The invention relates to a user interface arrangement (1) for displaying and/or playing back video sequences (2), said video sequences (2) each displaying an event and being captured during a monitoring period (12), wherein said user interface arrangement (1) has a control unit (4) and a screen (3). Said control unit (4) controls said screen (3) for showing a display (6), said display (6) comprising a timeline (7) that indicates said monitoring period (12) or a portion of the monitoring period (12). The display (6) comprises at least one marking (8) for chronologically classifying and for
(Continued)

indicating the duration of the at least one video sequence (2) on said timeline (7) or in relation to the timeline (7).

17 Claims, 3 Drawing Sheets

(51) Int. Cl.
  *G08B 13/196*  (2006.01)
  *G11B 27/34*  (2006.01)
  *H04N 7/18*  (2006.01)
(52) U.S. Cl.
  CPC . *G08B 13/19673* (2013.01); *G08B 13/19682* (2013.01); *G11B 27/34* (2013.01); *H04N 7/181* (2013.01)
(58) Field of Classification Search
  USPC .......................................................... 348/152
  See application file for complete search history.

(56) References Cited

U.S. PATENT DOCUMENTS

| | | | | |
|---|---|---|---|---|
| 8,006,262 | B2* | 8/2011 | Rodriguez | H04N 7/17318 725/37 |
| 8,229,287 | B1* | 7/2012 | Duggal | H04N 5/76 386/343 |
| 8,595,375 | B1* | 11/2013 | Kuznetsov | H04L 29/06027 709/219 |
| 2002/0120545 | A1 | 8/2002 | Katz | |
| 2006/0171453 | A1* | 8/2006 | Rohlfing | G08B 13/19632 375/240.01 |
| 2006/0288288 | A1* | 12/2006 | Girgensohn | G06F 17/3079 715/716 |
| 2007/0033632 | A1* | 2/2007 | Baynger | G11B 27/034 725/135 |
| 2007/0234215 | A1* | 10/2007 | Graham | G06F 17/3005 715/723 |
| 2008/0155631 | A1* | 6/2008 | Liwerant | H04M 3/567 725/114 |
| 2009/0087163 | A1* | 4/2009 | Busch | G08B 13/19645 386/239 |
| 2009/0220206 | A1* | 9/2009 | Kisliakov | G11B 27/034 386/353 |
| 2010/0281380 | A1* | 11/2010 | Langmacher | G06F 3/04847 715/723 |
| 2011/0258547 | A1* | 10/2011 | Symons | G06F 3/04817 715/723 |
| 2012/0131461 | A1* | 5/2012 | Raymond | G11B 27/10 715/723 |
| 2013/0091432 | A1* | 4/2013 | Shet | G08B 13/19645 715/719 |
| 2013/0222263 | A1* | 8/2013 | Shah | G06F 3/0488 345/173 |
| 2014/0013243 | A1* | 1/2014 | Flynn, III | G06F 3/0488 715/753 |

FOREIGN PATENT DOCUMENTS

| | | |
|---|---|---|
| WO | 2006074328 | 7/2006 |
| WO | 2007009238 | 1/2007 |

* cited by examiner

USER INTERFACE ARRANGEMENT AND COMPUTER PROGRAM FOR DISPLAYING A MONITORING PERIOD

BACKGROUND OF THE INVENTION

The invention relates to a user interface arrangement for displaying and/or playing back video sequences. The video sequences each display an event and are captured in a monitoring period. The user interface arrangement comprises a control device and a screen, wherein the control device controls the screen for outputting a display. The latter comprises a timeline indicating the monitoring period or a part of the monitoring period. The invention also relates to a computer program for the user interface arrangement.

The monitoring of public spaces or rooms by video cameras is widespread nowadays. A screen and an operating device are often used for viewing the video recordings effected in the course of monitoring. The video recordings are usually replayed on the screen, wherein the replay of said video recordings is controllable by the operator device. It is known that symbols for the video recordings are displayed on the screen in time staggered order and are selectable and controllable by the operating device.

By way of example, the document DE 10 2006 059 065 A1, which probably forms the closest prior art, discloses a display for representing a course of a recording process, wherein the display represents, with time staggered resolution, video data of events recorded during the recording process.

SUMMARY OF THE INVENTION

The invention proposes a user interface arrangement for displaying and/or playing back video sequences. The video sequences are preferably embodied as time limited video recordings of a location, in particular of a monitoring region, specifically of a space or room. It is possible for the video sequences to differ in terms of their duration. In particular, the video sequences each comprise a juxtaposition of temporally successive images of the location.

The video sequences are captured in a monitoring period, in particular overall monitoring period. The monitoring period, in particular beginning, duration and end, can be defined freely by a user. By way of example, the monitoring period can encompass a period of 24 hours or a work shift of eight hours. It is preferred for at least one video sequence, but preferably two or more video sequences, to be captured in the monitoring period.

Each video sequence in each case displays at least one actual or potential event. The event can comprise for example an existence of a person, a movement, a suspicious or conspicuous action and/or a change in a number of persons at the video-monitored location. The capture of the video sequences can be started and ended manually; alternatively, the cameras or a monitoring system can control the capture and the end of the video sequences in an automated manner. By way of example, the video sequence can be captured in an automated manner if, by means of image processing algorithms, e.g. movements are identified in the image or a search object, such as e.g. a face, is recognized. Alternatively, external capture triggers can control the capture of the video sequences, such as e.g. an access control system connected to the camera or the monitoring system, wherein the access control system controls the capture of a video sequence upon access by a person.

The user interface arrangement comprises a control device and a screen. The control device is designed to control the screen for outputting a display. The display comprises a timeline, which indicates, in particular optically images or visualizes, the monitoring period or a part of the monitoring period. By way of example, the timeline comprises indications regarding the year, month, date and/or regarding the time of day of the beginning, the capture time or replay time and/or the end of the monitoring period or of the part of the monitoring period.

According to the invention, the display comprises at least one marking for temporally classifying and for indicating the duration of the at least one video sequence on the timeline or in relation to the timeline. In particular, the marking is designed to provide optical information and/or an optical indication about when the at least one video sequence was captured in the monitoring period or in the part of the monitoring period and how long it lasts, in particular when the video sequence begins and/or ends.

It is advantageous that the display of the at least one marking makes it possible for a user to recognize at a glance when the video sequence was captured in the monitoring period or in the part of the monitoring period and how long it lasts, or when it begins or ends. The user can grasp this information rapidly and simply by virtue of the at least one marking. Furthermore, an intuitive control of the display by the user can be ensured.

In one preferred configuration of the invention, the at least one marking is embodied as or comprises a bar or a line. Preferably, the length of the marking is adapted to the duration of the at least one video sequence. In particular, the marking has a length that is all the greater, the longer the duration of the video sequence. As a result of the embodiment of the marking as a bar or line, the marking is easily comprehensible and self-explanatory to the user. Particularly preferably, the length of the marking corresponds to the duration of the video sequence on the timeline, such that the duration of the video sequence on the timeline can be read off or estimated in a simple manner.

In one preferred embodiment, the display comprises at least one video sequence symbol—can also be referred to as video event symbol. Preferably, the video sequence symbol refers to a video sequence assigned to it, in particular disposed behind it, or to an event within the video sequence. In particular, the video sequence symbol is embodied as a still image that is reduced in size compared with an overall image on the screen. Alternatively, the video sequence symbol is embodied as an excerpt from the overall image which shows the region in which the event took place (e.g. excerpt only of the recognized face).

In one preferred implementation of the invention, the at least one video sequence symbol is displayed as at least one preview image. Alternatively, the video sequence symbol is displayed as a title, a caption and/or as a numbering or by some other suitable indication.

It is preferred for the at least one marking to produce a preferably direct and/or immediate visual relation between the at least one video sequence symbol and the timeline. The at least one marking refers in particular to a point in time of the event captured in the respective video sequence on the timeline. Optionally, the marking comprises a line, an arrow or some other suitable linking means by which the marking is linked with the video sequence symbol or is assigned thereto.

It is particularly preferred for a capture date of the corresponding video sequence and/or a time counter of the duration of the video sequence to be assigned to one, a plurality of, or each video sequence symbol and/or the corresponding marking(s). By way of example, the capture date and/or the time counter are/is arranged above, below or alongside the video sequence symbol. It is also possible for the capture date and/or the time counter to be displayed on the line, the arrow or the other suitable linking means.

It is particularly preferred for two or more video sequence symbols to be displayed in a juxtaposed manner in a list, in particular in a row or column. Optionally, the video sequence symbols of video sequences captured earlier are displayed further toward the top or further toward the left than the video sequence symbols of video sequences captured later.

One preferred implementation of the invention provides for the video sequence symbols of the list to be at a uniform distance from one another independently of their temporal classification on the timeline. Alternatively or optionally supplementarily, the video sequence symbols of the list are arranged at a uniform distance from one another independently of their duration and/or independently of their capture beginning and end on the timeline. Particularly preferably, however, the list is ordered chronologically, in particular in accordance with the direction of the timeline.

In one possible configuration of the invention, the list, the at least one marking and the timeline are displayed together in a vertical or horizontal arrangement. Preferably, the list, the at least one marking and the timeline are arranged parallel to one another. This has the advantage, in particular, that for the user the display can be grasped clearly and rapidly and is easily operable or controllable.

In one preferred embodiment of the invention, the display comprises the at least one video sequence, or a representation of the video sequence. The latter can preferably be played back on the screen. In particular, the video sequence is played back as an overall image on the screen. It is also possible for the video sequence to be played back as a partial image on the screen, wherein the timeline, the marking and the list are also displayed alongside the video sequence.

One preferred configuration of the invention provides for the user interface arrangement to comprise an operating device designed for operating and/or selecting the display, in particular partial regions of the display. Preferably, the operating device is embodied as a keyboard, a mouse and/or as a touch-sensitive surface. It is also possible for the user interface arrangement to be embodied as a touchscreen comprising the screen and the operating device. In particular, the touchscreen is designed for outputting the display and at the same time for operating or controlling the latter by touch using one or more fingers. Specifically, the control can be implemented by a multitouch movement using two fingers for zooming regions in the display.

One preferred implementation of the invention provides for the at least one video sequence symbol to be selectable or controllable by the operating device, such that the assigned video sequence is played back. Optionally supplementarily, the user can displace the displayed video sequence symbols of the list with the operating device on the overall image and/or scroll through the video sequence symbols. In particular, the video sequence symbols of the list are displaceable vertically in the case of the vertical arrangement and horizontally in the case of the horizontal arrangement. This has the advantage that the user can intuitively search for the desired video sequence symbol within the list and can select the corresponding video sequence for playback.

It is particularly preferred that the user can displace the timeline and zoom in/out. During the displacement, the list of video sequence symbols is automatically moved concomitantly, at the matching scrolling speed, such that, for the markings instantaneously visible on or at the timeline, the associated video sequence symbols are visible on the display. Alternatively or supplementarily, the list of video sequence symbols can also be displaced, as a result of which the timeline and the markings move concomitantly at the matching speed. Preferably, the video sequence symbols in the list have the same size, independently of how far apart from one another they are temporally on the timeline. Upon the displacement of the list, the timeline can be concomitantly displaced at a different (nonlinear) speed in order to show the markings and the associated video sequence symbols simultaneously on the display. The same behavior can be implemented upon the displacement of the timeline. The zooming of the timeline can be implemented by means of a multitouch movement, in particular.

In one preferred configuration of the arrangement, the display comprises a first operating element. By way of example, the first operating element is displayed as a pointer, a needle and/or as a sliding controller. The first operating element is preferably arranged on the timeline and displaceable along the longitudinal extent thereof, wherein it points to or in the direction of the video sequence symbols.

Preferably, a replay time on the timeline is selectable and controllable by the first operating element, such that the video sequence assigned to the selected and/or controlled replay time can be started and played back at the selected replay time by a further command input, such as e.g. a click on the operating element. As an alternative thereto, an image of the video sequence that corresponds temporally to the replay time is represented as a still image on the display.

Optionally, the operating element comprises an additional field, on which the replay time currently chosen is represented.

Optionally, the user interface arrangement can be designed such that, for the case where the timeline or the list of video sequence symbols was displaced to an extent such that the first operating element would move beyond the display, the first operating element is parked at the margin and continues to display the replay time currently selected. If the first operating element or the display of the currently chosen replay time of the first operating element is chosen by a command input, such as e.g. a click, the timeline and/or the list of video sequence symbols is displaced such that the first operating element is displayed temporally positionally correctly, e.g. in a centered manner, on the timeline. As a result, one can find one's way back rapidly again to the replay time currently chosen if one has "gone astray" as a result of zooming/scrolling.

Preferably, the list of video sequence symbols is displaced depending on the position of the first operating element in such a way that the first operating element, one of the markings and an associated video sequence symbol form a series and/or the marking and the associated video sequence symbol are centered with respect to the first operating element.

In one preferred configuration of the invention, the display comprises a second operating element which is selectable and/or operable by the operating device. The second operating element is displayed for example as a pushbutton, switch and/or as a sliding controller on the screen. Preferably, the second operating element is designed for stop-start selection, for jumping between the video sequence symbols of the list and/or for a quick search within a played-back video sequence. In particular, the user can use the second operating element as an alternative or in addition to the selection and control of the video sequence symbols by means of the first operating element or directly by means of the video sequence symbols of the list.

Further subject matter of the invention relates to a computer program. In particular, the computer program is designed to carry out all steps for the intended application of the user interface arrangement if the computer program is run on a computer or the user interface arrangement.

BRIEF DESCRIPTION OF THE DRAWINGS

Further features, advantages and effects of the invention are evident from the following description of preferred exemplary embodiments of the invention. In this case.

DETAILED DESCRIPTION

Mutually corresponding or identical parts are provided in each case with the same reference signs in the figures.

Figure 1:
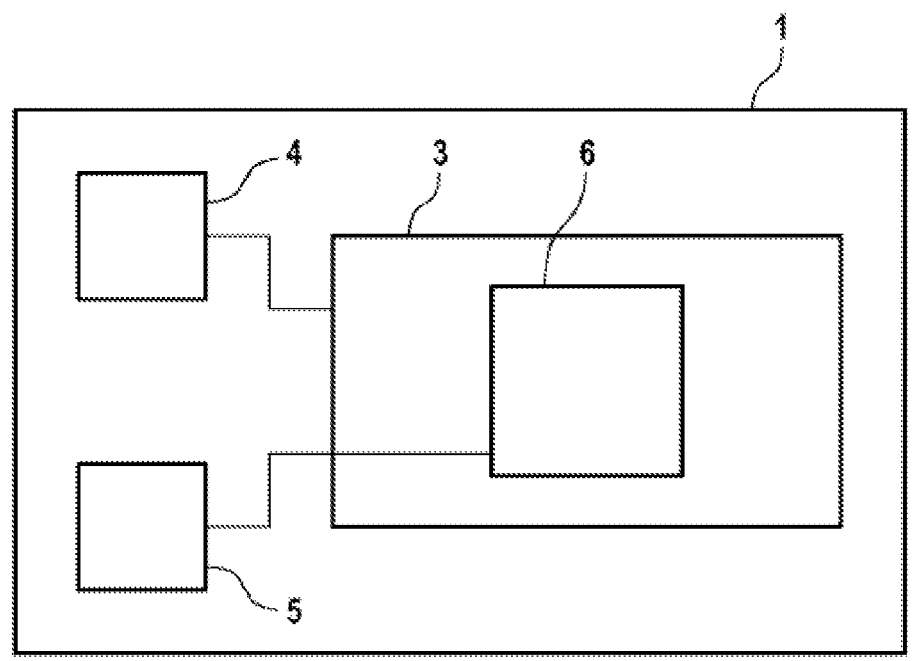
FIG. 1 shows a user interface arrangement comprising a control device, an operating device and a screen with a display.
Figure 2:
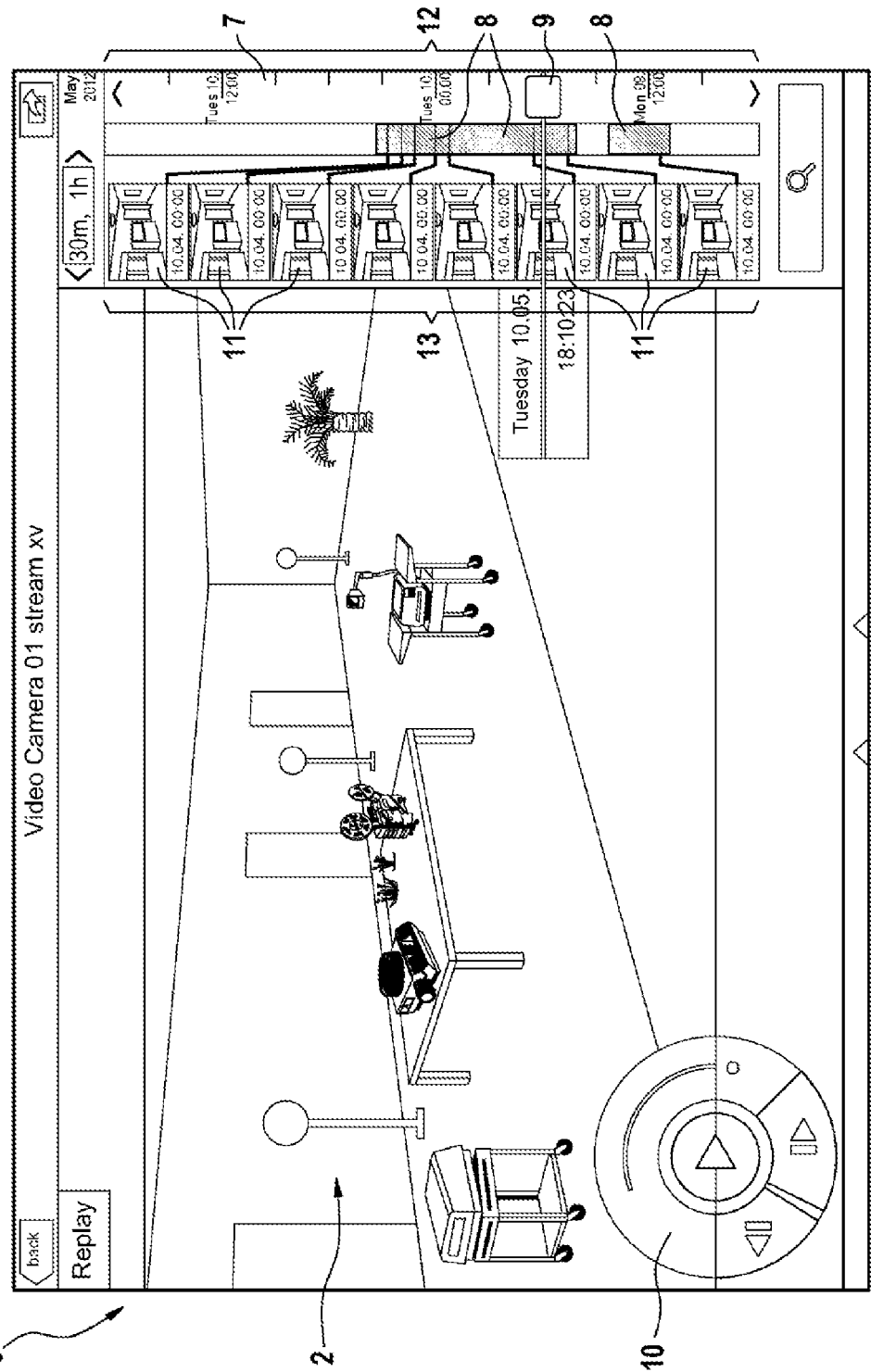
FIG. 2 shows the display from FIG. 1 with a timeline, a first marking and video sequence symbols.

FIG. 1 shows a user interface arrangement 1 for displaying and/or playing back video sequences 2 (FIG. 2). Preferably, the video sequences 2 have been recorded by at least one video camera (not illustrated) and indicate a time limited event.

The user interface arrangement 1 comprises a screen 3, a control device 4 and an operating device 5. The control device 4 controls the screen 3 for outputting a display 6. By means of the operating device 5, the display 6 is selectable and/or controllable by a user. The operating device 5 is embodied as a keyboard, a mouse and/or as a touch-sensitive surface. It is possible for the operating device 5 and/or the user interface arrangement 1 to be embodied as a touchpad or touchscreen.

FIG. 2 shows the display 6 that is output as an overall image on the screen 3. The display 6 comprises the video sequence 2 currently being played back, a vertically running timeline 7, a plurality of markings 8, a first operating element 9, a second operating element 10 and a plurality of video sequence symbols 11. The number of displayed markings 8 corresponds to the number of displayed video sequence symbols 11.

The various video sequences 2 captured by the video camera are represented by the video sequence symbols 11 in the display 6. In particular, each video sequence symbol 11 is assigned a video sequence 2 and specifically an event. The video sequence symbols 11 are juxtaposed one below another and arranged in a vertically running list 13. The video sequence symbols 11 of the list are at a uniform distance and/or have a uniform length within the list 13 independently of the duration and/or a capture beginning and end of the video sequences 2 assigned to them.

The video sequence symbols 10 are embodied as preview images, wherein a still image of the event from the video sequence 2 assigned to them is shown on each preview image. An associated capture date and a capture time counter are displayed below each video sequence symbol 11.

Figure 3:
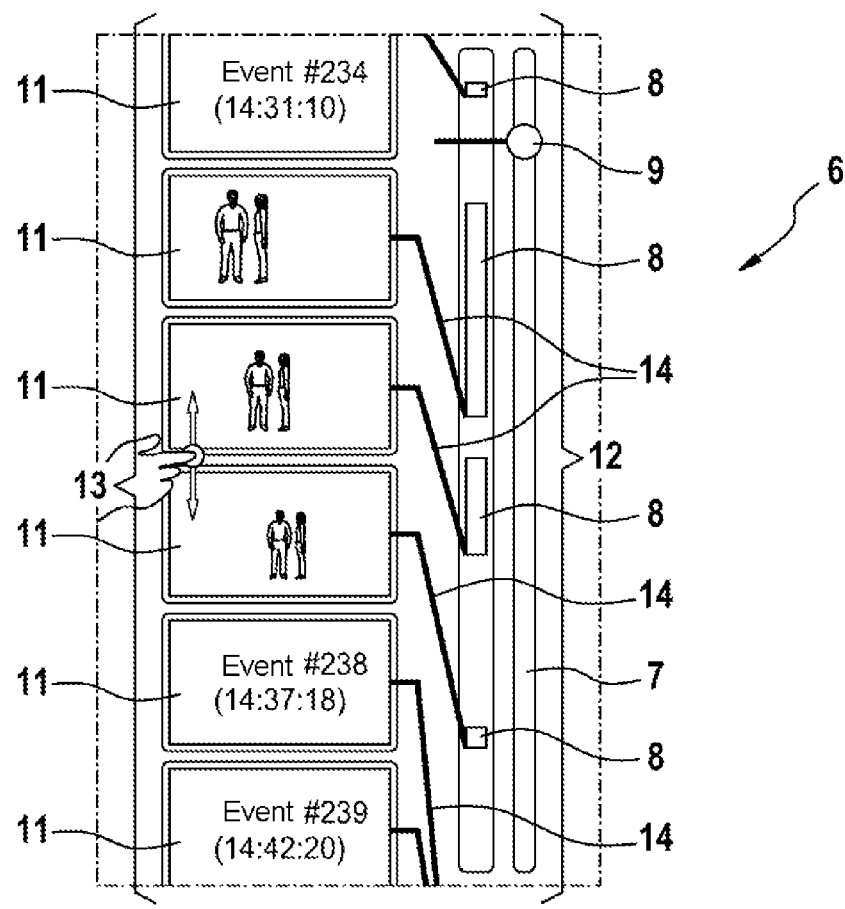
FIG. 3 shows an alternative display to that from FIG. 2.

In accordance with FIG. 3, the video sequence symbols 10 can alternatively also be displayed as a numbered title or as a caption with the corresponding capture time.

By means of the operating device 5, the user can displace the video sequence symbols 10 of the list 13 upward or downward or can scroll through the latter. Furthermore, the user can select the desired video sequence symbol 10 by means of the operating device 5 and can start the playback of the assigned video sequence 2.

The timeline 7 indicates a monitoring period 12 or a part of the monitoring period 12 within which the video sequences 2 are captured. In the example in FIG. 2, the monitoring period 12 comprises a period of 24 hours, in particular from Monday, May 9, 2012, 12 p.m. to Tuesday, May 10, 2012, 12 p.m. Within the monitoring period 12, a location, in particular a room in a building, is monitored by the video camera, the latter capturing a plurality of video sequences 2 in the process.

The second operating element 10 comprises a pushbutton representation and a sliding controller representation, which are operable and/or controllable by the operating device. By means of the pushbutton representation, the user can skip forward or backward from one video sequence symbol 11 to the next within the list 13, select the desired video sequence symbol 11 and thereby play back the video sequence 2 assigned to the video sequence symbol 11. By means of the sliding controller representation, the user can carry out a quick search within the video sequence 2.

FIG. 3 shows an alternative display 6 on the screen 3 of the user interface arrangement 1. The alternative display 6 comprises the timeline 7, the markings 8 and the video sequence symbols 11 arranged in the list 13, wherein all these are displayed parallel and in a vertical arrangement with respect to one another.

Figure 4:
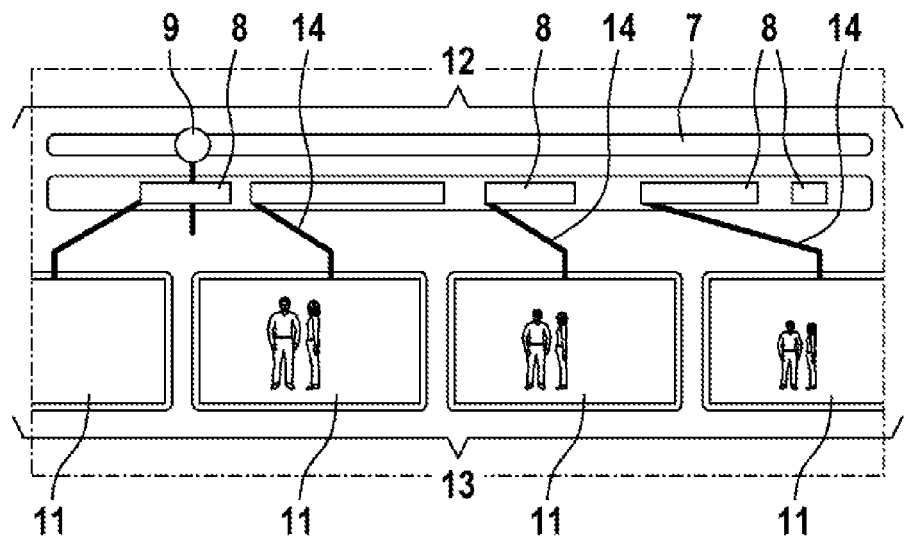
FIG. 4 shows a further alternative to the displays from FIGS. 2 and 3.

In an alternative exemplary embodiment in accordance with FIG. 4, the timeline 7, the markings 8 and the video sequence symbols 11 arranged in the list 13 can also be displayed in a horizontal arrangement and parallel to one another.

The markings 8 are arranged between the timeline 7 and the video sequence symbols 11 of the list 13 and are embodied as bars of different lengths. Each marking 8 is directly assigned to a video sequence symbol 11. For this purpose, the marking 8 has a connecting line 14 connecting it to the video sequence symbol 11 assigned to it.

The markings 8 are designed to temporally classify the video sequences 2 assigned to them by the video sequence symbols 11 in relation to the timeline 7 and to indicate the duration of the video sequences 2. In particular, a direct visual relation between the video sequence symbols 11 and the timeline 7 is produced by the markings 8. For this purpose, the bars run parallel to the timeline 7 and are arranged directly alongside the latter. It is also possible for the bars to be arranged on the timeline 7. This clear optical arrangement enables the user to recognize rapidly and simply, in particular at a glance, when the individual video sequences 2 were captured in the monitoring period 12 and how long they last.

The display 6 comprises the first operating element 9, which is embodied as a needle or a pointer. The first operating element 9 is arranged on the timeline 7 and is displaceable upward and downward along said timeline by the operating device 5, in order to stipulate a current replay time. It is possible here for the day of the week, the date and/or the capture time to appear in the display 6 (in this respect, see FIG. 2) when the needle or the pointer touches a video sequence symbol 11 or a marking 8 or is displaced across this.

By displacing the first operating element 9 on the timeline 7, the user can select the current replay time within the monitoring period 12 and search for the desired video sequence symbol 11, subsequently select the latter and start and playback the video sequence 2 assigned to the video sequence symbol 11 and at a specific capture time. This enables a direct interaction between the timeline 7 and the video sequences 2 represented by the video sequence symbols 11 or the events shown in the video sequences 2.

The invention claimed is:

1. A user interface arrangement for displaying video sequences, wherein the video sequences each display an event and are captured in
   a monitoring period,
   wherein the user interface arrangement comprises a control device and a screen, wherein the control device controls the screen for outputting a display,
   wherein the display includes
      a timeline indicating the monitoring period or a part of the monitoring period,
      at least one marking for temporally classifying and for indicating the duration of the at least one video sequence on the timeline or in relation to the timeline, and
      a list of video sequence symbols, the list including at least one video sequence symbol corresponding to the at least one video sequence on the timeline,
      wherein the at least one marking produces a visual relation between the at least one video sequence symbol and a period of the at least one video sequence on the timeline, and
      wherein the list of video sequence symbols, the at least one marking, and the timeline are arranged parallel to each other.

2. The user interface arrangement as claimed in claim 1, wherein the at least one marking embodied as a bar or a line, the length of which is adapted to the duration of the at least one video sequence.

3. The user interface arrangement as claimed in claim 1, wherein the at least one video sequence symbol is displayed as at least one preview image.

4. The user interface arrangement as claimed in claim 1, wherein two or more video sequence symbols are displayed in a juxtaposed manner in the list, wherein the video sequence symbols in the list are at a uniform distance from one another independent of their temporal classification on the timeline.

5. The user interface arrangement as claimed in claim 1, wherein the list, the at least one marking and the timeline are displayed together in a vertical or horizontal arrangement and are arranged parallel to one another.

6. The user interface arrangement as claimed in claim 1, wherein the display comprises the video sequence.

7. The user interface arrangement as claimed in claim 1, wherein the user interface arrangement comprises a cursor control device designed for controlling the display.

8. The user interface arrangement as claimed in claim 7, wherein the cursor control device includes at least one selected from the group consisting of a keyboard, a mouse, and a touch-sensitive surface.

9. The user interface arrangement as claimed in claim 7, wherein the display comprises a first operating element which is selectable by the cursor control device and which is displaceable on the timeline and by means of which a replay time is selectable.

10. The user interface arrangement as claimed in claim 1, wherein the display comprises a second operating element which is selectable by the cursor control device and which is designed for at least one selected from the group consisting of a start/stop selection, for jumping between the video sequence symbols of the list and for a quick search within a played-back video sequence.

11. The user interface arrangement as claimed in claim 1, wherein said user interface arrangement includes a computer system.

12. A non-transitory, computer readable medium having a computer program stored thereon that, when executed on a user interface arrangement having a control device and a screen, cause the user interface arrangement to,
   display video sequences, wherein the video sequences each display an event and are captured in a monitoring period,
   control the screen for outputting a display,
   generate a timeline indicating the monitoring period or a part of the monitoring period,
   generate at least one marking for temporally classifying and for indicating the duration of the at least one video sequence on the timeline or in relation to the timeline, and
   generate a list of video sequence symbols, the list including at least one video sequence symbol corresponding to the at least one video sequence on the timeline,
   wherein the at least one marking produces a visual relation between the at least one video sequence symbol and a period of the at least one video sequence on the timeline, and
   wherein the at least one marking is positioned between the list of video sequence symbols and the timeline.

13. The user interface arrangement as claimed in claim 1, wherein the at least one marking refers to a point in time of an event captured in the respective video sequence on the timeline.

14. The user interface arrangement as claimed in claim 1, wherein the at least one video sequence symbol is embodied as an excerpt from an overall image which shows a region in which an event captured in the respective video sequence took place.

15. The user interface arrangement as claimed in claim 1, wherein a capture date and a time counter of a duration of a corresponding video sequence is assigned to the at least one video sequence symbol and the at least one marking.

16. A user interface arrangement for displaying video sequences, wherein the video sequences each display an event and are captured in
   a monitoring period,
   wherein the user interface arrangement comprises a control device and a screen, wherein the control device controls the screen for outputting a display,
   wherein the display includes
      a timeline indicating the monitoring period or a part of the monitoring period,
      at least one marking for temporally classifying and for indicating the duration of the at least one video sequence on the timeline or in relation to the timeline, and
      a list of video sequence symbols, the list including at least one video sequence symbol corresponding to the at least one video sequence on the timeline,
      wherein the at least one marking produces a visual relation between the at least one video sequence symbol and a period of the at least one video sequence on the timeline, and
      wherein the at least one marking is positioned between the list of video sequence symbols and the timeline.

17. A non-transitory, computer readable medium having a computer program stored thereon that, when executed on a user interface arrangement having a control device and a screen, cause the user interface arrangement to,
- display video sequences, wherein the video sequences each display an event and are captured in a monitoring period,
- control the screen for outputting a display,
- generate a timeline indicating the monitoring period or a part of the monitoring period,
- generate at least one marking for temporally classifying and for indicating the duration of the at least one video sequence on the timeline or in relation to the timeline, and
- generate a list of video sequence symbols, the list including at least one video sequence symbol corresponding to the at least one video sequence on the timeline,
- wherein the at least one marking produces a visual relation between the at least one video sequence symbol and a period of the at least one video sequence on the timeline, and
- wherein the list of video sequence symbols, the at least one marking, and the timeline are arranged parallel to each other.

\* \* \* \* \*